Feb. 23, 1937.  J. L. ANDERSON  2,071,809
WELDED STRUCTURE
Filed Nov. 10, 1933
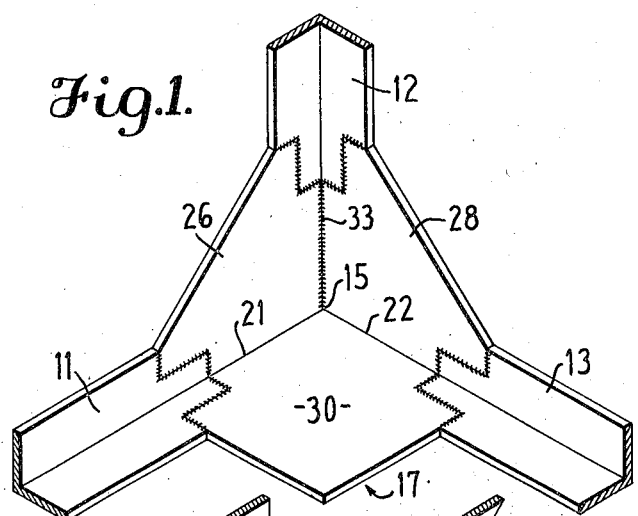
Fig.1.
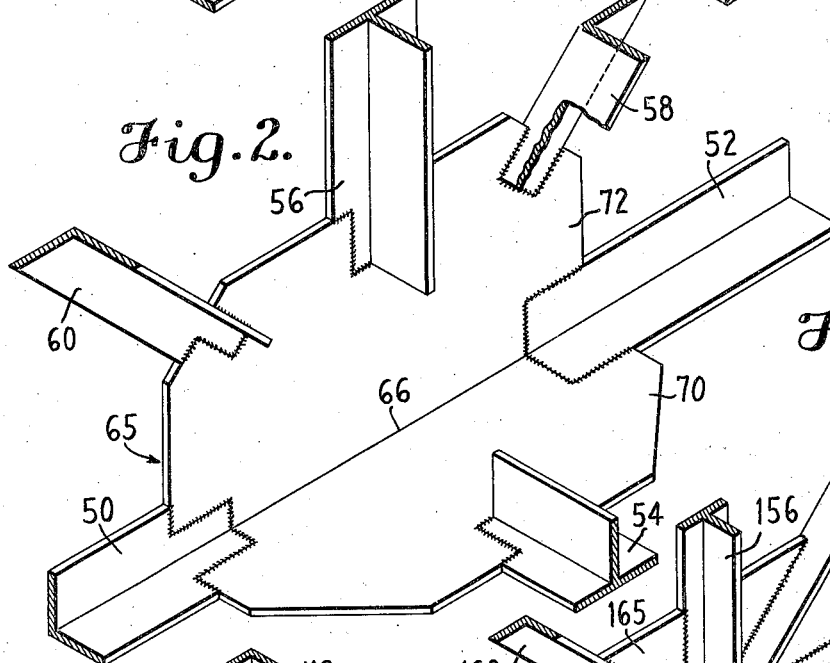
Fig.2.
Fig.4.
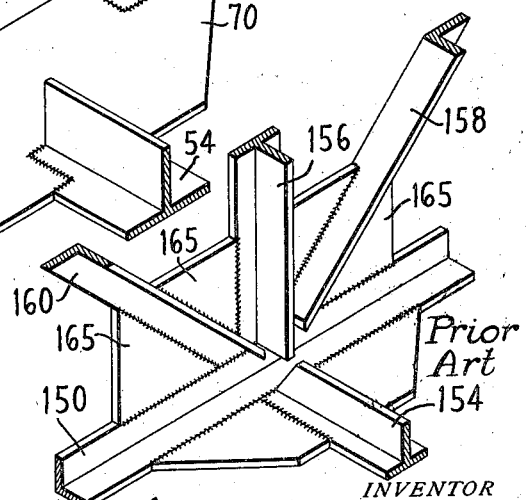
Fig.3.
Prior Art
Prior Art
INVENTOR
James L. Anderson
BY J. F. Brandenburg
ATTORNEY Patented Feb. 23, 1937

2,071,809

UNITED STATES PATENT OFFICE 2,071,809

WELDED STRUCTURE

James L. Anderson, Closter, N. J., assignor to Air Reduction Company, Incorporated, New York, N. Y., a corporation of New York Application November 10, 1933, Serial No. 697,450

10 Claims. (Cl. 189—36)

This invention relates to welded structures, and particularly to the connection of angles and other structural members at the dihedral and trihedral corners of a structure.

When structural members disposed at an angle to one another are connected by welding, the connection is braced by a gusset plate, of substantially the same thickness as the member, placed in the vertex of the angle in contact with the edges of the structural members, and the abutting edges are welded together. The welding heat applied to the edge of the gusset plate tends to expand the plate and increase the length of the heated edge, but the cool metal of the plate behind the edge restrains this expansion of the edge portion and the expansive force produces a certain amount of upsetting of the metal which often causes the edge of the plate to be shorter after it cools than it was before being heated.

When the structural member is an angle, the heat applied to the edge in contact with the gusset causes that edge to expand. The heel of the angle and the metal of the unheated leg resist this expansion, but the metal of the unheated leg does not lie in the same plane as the heated edge portion and is therefore not as effective as the cool metal of a gusset plate in restraining expansion. The expansion of the heated edge causes the angle to bow and curve away from the straight edge of the gusset plate. This action may be sufficient to disturb the alignment of the structure.

The gap which forms between the edges of the angle and the gusset can be filled with metal from the welding rod, but the locked-up stresses in the weld after cooling are enormous and greatly weaken the ultimate strength of the connection. The bowing of the angle is sometimes allowed for by bending the angle before welding so that it is bowed in the opposite direction to the bow produced by the welding heat. As the edge is heated during the welding operation, it expands and straightens the angle. This preliminary bending of the angle adds to the labor of making the welded connection but produces satisfactory results when connecting the first gusset plate to the angle. It is difficult, however, to bend the angle and its attached gusset plate to allow for expansion when welding a gusset to the other leg of the angle, and in the welding together of trihedral corners it soon becomes impossible to make preliminary bends for offsetting expansion of the heated edges.

Distortion from uneven heating is sometimes avoided by heating all of the parts at the same time to produce a substantially equal expansion. The parts can not be heated to a fusion temperature, but they are heated to a very high degree so that the additional heat in the welded edges causes no substantial distortion. This uniform heating of all parts is costly because of the large amount of heat required, and it is impracticable because the parts are soft while highly heated and must therefore be supported to carry their own weight and the loads on them.

It is an object of this invention to provide a practical and economical method for welding the dihedral and trihedral corners of a structure to obtain strong and reliable connections which are substantially free from locked-up stresses.

Another object of the invention is to provide a novel corner angle for connecting the structural angles, or other members, of a welded structure. The corner angle is recessed to receive the ends of the structural members and is connected to them by welding along its edges where they adjoin the structural members.

Another object is to combine the structural members with a corner angle in such a way that the parts which expand differently when heated are connected by welds of short length so that any distortion of the heated structure is localized, and there are substantially no stresses locked up in the connections after cooling. Another object is to connect the structural members in the manner indicated and to increase the strength of the connection by making the weld of such an outline that it is subject to shearing stress throughout a portion of its length.

In the accompanying drawing:

Fig. 1 is a perspective view of a corner of a welded structure embodying the invention;

Fig. 2 is a perspective view showing an embodiment of the invention in a connection of structural sections lying in two planes only; and Figs. 3 and 4 are reduced perspective views illustrating conventional welded structures connecting the same structural sections shown in Figs. 1 and 2, respectively.

Three structural angles 11, 12 and 13 extend at right angles to one another and their lines of intersection, if projected, meet in a common point 15. A plate 17 of substantially the same thickness as the angles is bent along the lines 21 and 22. These lines 21 and 22 are at right angles to one another and meet at the point 15. The plate 17 is so shaped that when its end portions 26 and 28 are bent upward along the lines 21 and 22, respectively, to make right dihedral angles with the mid-portion 30 of the plate, the opposing upwardly extending edges of the end portions 26 and 28 meet along a line 33 which intersects the point 15. The adjacent edges along the line 33 are welded together so that the bent plate 17 forms a solid or right trihedral angle.

The mid-portion 30 is substantially rectangular and the upstanding portions 26 and 28 are substantially triangular, but the original shape of the plate 17 can be designed so that any or all of these portions are rectangular or triangular or any other shape desirable for a gusset.

The structural angles 11, 12 and 13 are connected to the solid angle by welding. In order to obtain a longer bond than the combined length of the legs of the structural angles and to insure the accurate location of these individual angles with respect to the solid angle, recesses are cut in the edges of the solid angle and the ends of the structural angles are cut to fit these recesses, as shown in Fig. 1, so that the structural angles are mortised to the solid angle. The contacting edges of each structural angle and the solid angle are welded together, and a particularly strong connection is obtained because the welded metal along the sides of the recess is subject principally to shearing stress, and is therefore capable of withstanding great force.

The weld made along the line 33 is started at the point 15. The cooler metal of the portions 26 and 28 restrains expansion of the heated edges, but these portions 26 and 28 are free to expand and contract equally so that there is substantially no locked-up stress in the solid angle after it cools from the operation of welding along the line 33. The heating of the edges along the mortise joints does not cause any substantial distortion of the parts because the lengths of the edges heated are very short and there are therefore no substantial locked-up stresses in the structure after it cools.

The advantages of the construction shown in Fig. 1 can best be understood by comparing this structure with the ordinary welded corner shown in Fig. 3. Structural angles 111, 112 and 113, corresponding to the angles 11, 12 and 13 of Fig. 1, have their ends beveled at 45° so that their lines of intersection meet in a point 115. The abutting edges are welded together, and the structure is then braced by welding the gusset plates 126, 128 and 130 to the edges of the angles.

The welded corner in Fig. 3 has six long welded seams between the edges of the angles and gusset plates. The welding of these seams involves the problem of unequal expansion of the angles and gusset plates, and while the first seams to be welded may be kept substantially free from bowing due to the locked-up stresses by bending the angles before welding, it is impossible to make such bends after a number of the parts are joined together. Since unequal expansion of the angle and gusset, and subsequent unequal contraction, can not be avoided when welding the last seams, the structure cools with locked-up stresses of large magnitude in these final welds. If preliminary bending of the angles is not resorted to in making the first welds, all of the gusset plate connections will contain greater locked-up stresses.

Comparing the structure shown in Fig. 3 with that shown in Fig. 1, it is evident that the labor and cost of making the large number of welds in Fig. 3 is much greater than that required for the short weld connections of Fig. 1. The only long seam of Fig. 1 is the seam 33, and this seam connects flat portions which expand equally and therefore do not involve the distortion problem presented by the six long welded seams of Fig. 3.

Fig. 2 shows the invention applied to a connection of structural members extending in two planes only. Angles 50 and 52 extend in a straight line and form a dihedral corner of a structure. A T-section 54 extends in a horizontal plane and a T-section 56 extends vertically. Structural angles 58 and 60 are braces lying in a vertical plane and extending at an angle of 45° to the corner angles 50 and 52.

All of these structural members are connected by a corner angle 65, which is made by bending a single plate at right angles along a line 66. After the plate 65 has been bent to angle form, the edges are recessed to receive the ends of the angles 50, 52, 58 and 60, and the ends of T-sections 54 and 56.

The recesses for receiving the ends of angles 50 and 52 are located so that the heels of these angles are in alignment with the line 66 of the corner angle 65. The T-section 54 fits into a recess in the edge of the horizontal portion 70 of the corner angle 65, and the T-section 56 and structural angles 58 and 60 fit into recesses in the edge of the vertical portion 72 of the corner angle 65. As shown in the drawing, the corner angle 65 is made from a plate which is shaped so that its edges extend at right angles to the structural members at all points of connection, but this is not necessary and the corner angle can be bent from a rectangular plate.

The end of the angle 50 is cut to fit a narrow recess in the corner angle 65. The recess for the angle 52 is wide enough to receive the full width angle. Either form of butt joint can be used and the total length of the weld is the same in both cases. Narrow and full width recesses are shown for the angles 60 and 58, respectively, but where narrow recesses are used they are substantially wider than the thickness of that portion of the angle or T-section which extends at right angles to the surface of the angle 65 so that the welded joint is a butt joint throughout most of its length.

The term "butt joint" is used in the specification and claims to describe a joint formed by the abutting edges of surfaces in the same plane, as opposed to angle joints where the parts joined extend in intersecting planes, or lap joints where the edges do not abut.

The structure shown in Fig. 2 takes the place of the conventional welded structure shown in Fig. 4, in which the continuous angle 150 corresponds to the angles 50 and 52, and the structural angles 158 and 160 correspond to the angles 58 and 60, respectively, in Fig. 2. The T-sections 154 and 156 in Fig. 4 correspond to the T-sections 54 and 56, respectively, in Fig. 2. There are twelve long welded seams connecting the structural members of Fig. 4 with gusset plates 165, and some or all of these welded seams will contain locked-up stresses of large magnitude caused by unequal expansion of the angle and gusset and subsequent unequal contraction of the structural members. Fig. 2, on the other hand, has no long welded seams; the welded connections between the structural members and the corner plate 65 are so short that they involve substantially no problem of distortion and locked-up stresses. Welded structures made in accordance with this invention are inexpensive and can be made quickly because of the short length of the welded seams. The structures are strong and the computed ultimate strength can be relied upon because there are no locked-up stresses of sufficient magnitude to seriously affect the strength of the connection.

Two embodiments of the invention have been described, but changes and modifications can be made and some features of the invention used alone or in combination with other features without departing from the invention defined in the claims.

I claim:

1. A structural angle plate comprising a single plate bent to form an angle and having an edge recessed at the bend to receive a structural angle with the heel of said structural angle in substantial alignment with the bend of the angle plate, and other recesses in its edges for receiving other structural members.

2. An article of manufacture comprising a solid angle having its edges recessed at the outer end of each of its lines of intersection to receive structural angles and provide a joint for welding each structural angle to said solid angle.

3. A corner angle for welded structures comprising a single plate forming a right trihedral angle with two of the planes integral with the third plane, and a welded seam forming the third line of intersection of the angle, the edges of the angle being recessed to receive structural angles with their heels in alignment with the respective lines of intersection of the planes of said trihedral angle.

4. In a welded structure, a corner angle comprising a single plate forming a right trihedral angle with the edges of the plate recessed at the outer end of each of the lines of intersection of the angle; and structural angles fitting the recesses, with the line of intersection of each structural angle in substantial alinement with a line of intersection of the trihedral angle, said structural angles abutting the edges of the plate and being welded to the plate along the abutting edges.

5. In a welded structure, the combination of an angle plate forming a dihedral angle and having recessed edges at opposite ends of its line of intersection; structural angles fitting the recesses and welded to the angle plate with the ends of the structural angles abutting the edges of the angle plate; and other structural members extending at angles to said structural angles and welded to the angle plate in abutment with other recessed edges of said angle plate.

6. The combination, in a welded structure, of an angle plate and structural members mortised to the angle plate, with the recesses in the angle plate at the line of intersection of the angle plate, and the structural members welded to the plate along the abutting surfaces of the mortise joints.

7. An angle plate for connecting the members of a welded structure, said angle plate having cut-out recesses extending on both sides of the line of intersection of the angle plate for receiving structural angles and forming with said angles butt joints for welding, each of said joints being longer than a right section through the structural member and having a portion subject to shear when the joint is welded and the structure loaded.

8. A welded structure including in combination an angle plate having recesses in its edges at the ends of its line of intersection, and other recesses in the edge of the angle plate, said other recesses terminating short of the line of intersection of the angle plate, and structural members fitting the recesses in said edges and welded to the angle plate along the joint between the ends of the structural members and the sides of the edge recesses.

9. An angle plate for connecting the members of a welded structure, said angle plate having cut-out recesses shaped to receive the ends of angle and T-section structural members, each of said recesses terminating short of the line of intersection of said angle plate and having a width substantially greater than the thickness of that portion of the angle or T-section structural member which extends at an angle to the surface of the angle plate around the recess so that said angle or T-section structural member forms a butt joint with the angle plate throughout most of the length of the edge of the recess.

10. An angle plate for connecting the members of a welded structure, said angle plate having cut-out recesses extending on both sides of the line of intersection of the angle plate for receiving structural angles and forming with said angles butt joints for welding, said angle plate also having cut-out recesses terminating short of the line of intersection of said angle plate and each shaped to receive the end of a structural member and provide a butt joint with said member for at least a portion of the edge of the recess, all of said recesses in the angle plate being shaped so that the joints with the structural members are longer than the width of a right section through said members and have a portion subject to shear when the joint is welded and the structure loaded.

JAMES L. ANDERSON.